(12) United States Patent
Sordjan, Jr.

(10) Patent No.: US 6,905,207 B2
(45) Date of Patent: Jun. 14, 2005

(54) ANTI GLARE DUAL FIELD OF VISION GLASSES

(76) Inventor: Simeon Sordjan, Jr., 72-03A Forest Ave., Ridgewood, NY (US) 11835

(*) Notice: Subject to any disclaimer, the term of this patent is extended or adjusted under 35 U.S.C. 154(b) by 0 days.

(21) Appl. No.: 10/705,700

(22) Filed: Nov. 10, 2003

(65) Prior Publication Data
US 2005/0099593 A1 May 12, 2005

(51) Int. Cl.[7] .................................................. G02C 7/02
(52) U.S. Cl. ........................... 351/159; 351/44; 351/177
(58) Field of Search ........................... 351/159, 163–165, 351/177, 41, 44–45

(56) References Cited

U.S. PATENT DOCUMENTS

| 3,773,407 | A | * | 11/1973 | Stoner | 351/41 |
| 5,118,178 | A | * | 6/1992 | Tuckman | 351/57 |
| 6,174,059 | B1 | * | 1/2001 | Haley | 351/159 |
| 2002/0093622 | A1 | * | 7/2002 | Tostado | 351/57 |

* cited by examiner

Primary Examiner—Jordan M. Schwartz
(74) Attorney, Agent, or Firm—Jennifer Meredith, Esq.; Meredith & Keyhani, PLL

(57) ABSTRACT

A preferred embodiment includes a pair of eyeglasses comprising a right lens having a top edge, a bottom edge, and being in optical registry with the wearer's right eye, and a left lens having a top edge, a bottom edge and being in optical registry with the wearer's left eye. This creates an upper field of vision and a lower field of vision for the wearer created by the bottom edge of the right lens and the bottom edge of the left lens. The bottom edge of the right lens projects outward an angle between 0.5 degrees and 20 degrees from the vertical axis intersecting the top edge of the right lens and the bottom edge of left lens projects outward an angle between 0.5 degrees and 20 degrees from the vertical axis intersecting the top edge of the left lens.

28 Claims, 3 Drawing Sheets

ANTI GLARE DUAL FIELD OF VISION GLASSES

BACKGROUND OF THE INVENTION

The present invention relates to eyeglasses, and in particular to those which divide the wearer's field of vision into an upper and lower field of vision, wherein the upper field is corrected of tinted in some manner and the lower field of vision is unaltered. This is done while providing an angled lens to combat glare.

Nearsightedness or Myopia is a common affliction among millions of people in the United States alone. This is an imperfection in the eye which allows an individual the ability to see close by objects quite clearly, while significantly blurring objects at a distance from them. Correcting this problem is commonly done with eyeglasses having a corrective lens or set of lenses which compensate for the wearers inability to distinguish objects at a distance. Later in life, when these people develop a problem seeing even close objects are combined with the distance glasses in a bifocal lens. This type of lens allows the wearer to see distant objects through one lens while looking straight ahead and see nearby objects through another lens while looking downward.

Prior art teaches eyeglasses which are designed to segregate the field of vision into an upper corrected field and a lower uncorrected field. Specifically U.S. Pat. No. 6,174,059, issued to Haley teaches this system of segregating with a corrective set of lenses the wearer's field of vision into two segments. This does allow the wearer to see distant objects through a corrective lens and nearby objects below the lens. However this is distinguishable from the current subject of invention as it does nothing to accommodate glare or excess brightness caused by the sun or other reflections.

Often another vision problem posed to those who wear glasses is that of glare while driving which effectively blinds them for a moment. Additionally prescription sunglasses can be a pricey alternative for blocking sun while driving or walking outdoors. Another hindrance of such a remedy is that when driving through a tunnel or walking in and out of buildings on a sunny day, the wearer must constantly remove his or her sunglasses and replace them with regular lenses. Even if the wearer is wearing non-prescription sunglasses he or she is still burdened with constant removal of the glasses. Additionally while driving a motor vehicle, the afore mentioned glare can be not just irritating, but a dangerous condition to attempt to battle while operating a motor vehicle.

Hence the present subject of invention teaches a device which is able to accommodate near sighted individuals and those who wish to be able to drive without the constant worry of glare and removing their sunglasses. This is done by teaching a pair of eyeglasses which cover from 40 percent to 100 percent of the wearer's cornea while leaving an uncorrected field of vision below the bottom edge of the lens. Additionally the lenses are angled between 0.5 degrees and 20 degrees from the vertical axis to reduce glare.

SUMMARY OF THE INVENTION

The present invention relates to eyeglasses which cover from 40 percent to 100 percent of the wearer's cornea, while leaving a lower uncorrected region below the bottom edge of the lens. Additionally, to reduce glare, the lenses are angles from 0.5 degrees to 20 degrees from the vertical.

A preferred embodiment includes a pair of eyeglasses comprising a right lens having a top edge, a bottom edge and being in optical registry with the wearer's right eye, and a left lens having a top edge, a bottom edge and being in optical registry with the wearer's left eye. This creates an upper field of vision and a lower field of vision for the wearer created by the bottom edge of the right lens and the bottom edge of the left lens. The bottom edge of the right lens projects outward at an angle between 0.5 degrees and 20 degrees from the vertical axis intersecting said top edge of the right lens and the bottom edge of the left lens projects outward at an angle between 0.5 degrees and 20 degrees from the vertical axis intersecting the top edge of the left lens. This embodiment includes a frame having a first supporting element to rest on the bridge of the wearer's nose, attached to the right lens and the left lens, a second supporting element to rest above the wearers left ear and a third supporting element to rest above the wearer's right ear and the bottom edge of the right lens and the left lens being straight, unobstructed and aligned with the bottom of the wearer's cornea.

An alternate embodiment includes a right lens having a top edge, a bottom edge and being in optical registry with the wearer's right eye and a left lens having a top edge, a bottom edge and being in optical registry with the wearer's left eye. This creates an upper field of vision and a lower field of vision for the wearer created by the bottom edge of the right lens and the bottom edge of the left lens. The bottom edge of the right lens projects outward at an angle between 0.5 degrees and 20 degrees from the vertical axis intersecting said top edge of said right lens and the bottom edge of the left lens projects outward at an angle between 0.5 degrees and 20 degrees from the vertical axis intersecting the top edge of the left lens. This includes a frame having a supporting element to rest on the bridge of the wearer's nose, attached to said right lens and said left lens, a supporting element to rest above the wearer's left ear, a supporting element to rest above the wearer's right ear and the bottom edge of the right lens and the left lens being straight and unobstructed and the right lens and the left lens are positioned to cover between 40 percent and 90 percent of the wearer's cornea.

Yet another embodiment includes a right lens having a top edge, a bottom edge and being in optical registry with the wearer's right eye and a left lens having a top edge, a bottom edge and being in optical registry with the wearer's left eye. This creates an upper field of vision and a lower field of vision for the wearer created by the bottom edge of the right lens and the bottom edge of the left lens. The bottom edge of the right lens projects outward at an angle between 0.5 degrees and 20 degrees from the vertical axis intersecting the top edge of the right lens and the bottom edge of the left lens projects outward at an angle between 0.5 degrees and 20 degrees from the vertical axis intersecting the top edge of the left lens. This includes a frame having a first supporting element to rest on the bridge of the wearer's nose, attached to the right lens and the left lens, a second supporting element to rest above the wearer's left ear, a third supporting element to rest above the wearer's right ear, where the bottom edge of the right lens and he left lens are straight and unobstructed and the right lens and the left lens are positioned to cover between 40 percent and 100 percent of the wearer's cornea. Additionally the lenses are shaded or tinted and the right lens and the left lens provide an upper corrected field of vision and a lower uncorrected field of vision for the wearer's right eye and the wearer's left eye.

Another embodiment includes a method of manufacturing the afore mentioned eyeglasses including the steps of forming a right lens having a top a right lens having a top edge, a bottom edge and being in optical registry with wearer's right eye and forming a left lens having a top edge, a bottom edge and being in optical registry with the wearer's left eye. Followed by creating an upper field of vision and a lower field of vision for the wearer created by the bottom edge of the right lens and the bottom edge of the left lens and positioning the bottom edge of the right lens projecting outward at an angle between 0.5 degrees and 20 degrees from the vertical axis intersecting the top edge of the right lens and positioning the bottom edge of the left lens projecting outward at an angle between 0.5 degrees and 20 degrees from the vertical axis intersecting the top edge of the left lens. Followed by forming a frame having a first supporting element to rest on the bridge of the wearer's nose, attached to the right lens and the left lens, a second supporting element to rest above the wearer's left ear and a third supporting element to rest above the wearer's right ear.

This summary is not to be taken in a limiting sense, but is made merely for the purpose of illustrating the general principles of the invention, since the scope of the invention is best defined by the appended claims.

DETAILED DESCRIPTION OF THE PREFERRED EMBODIMENT

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
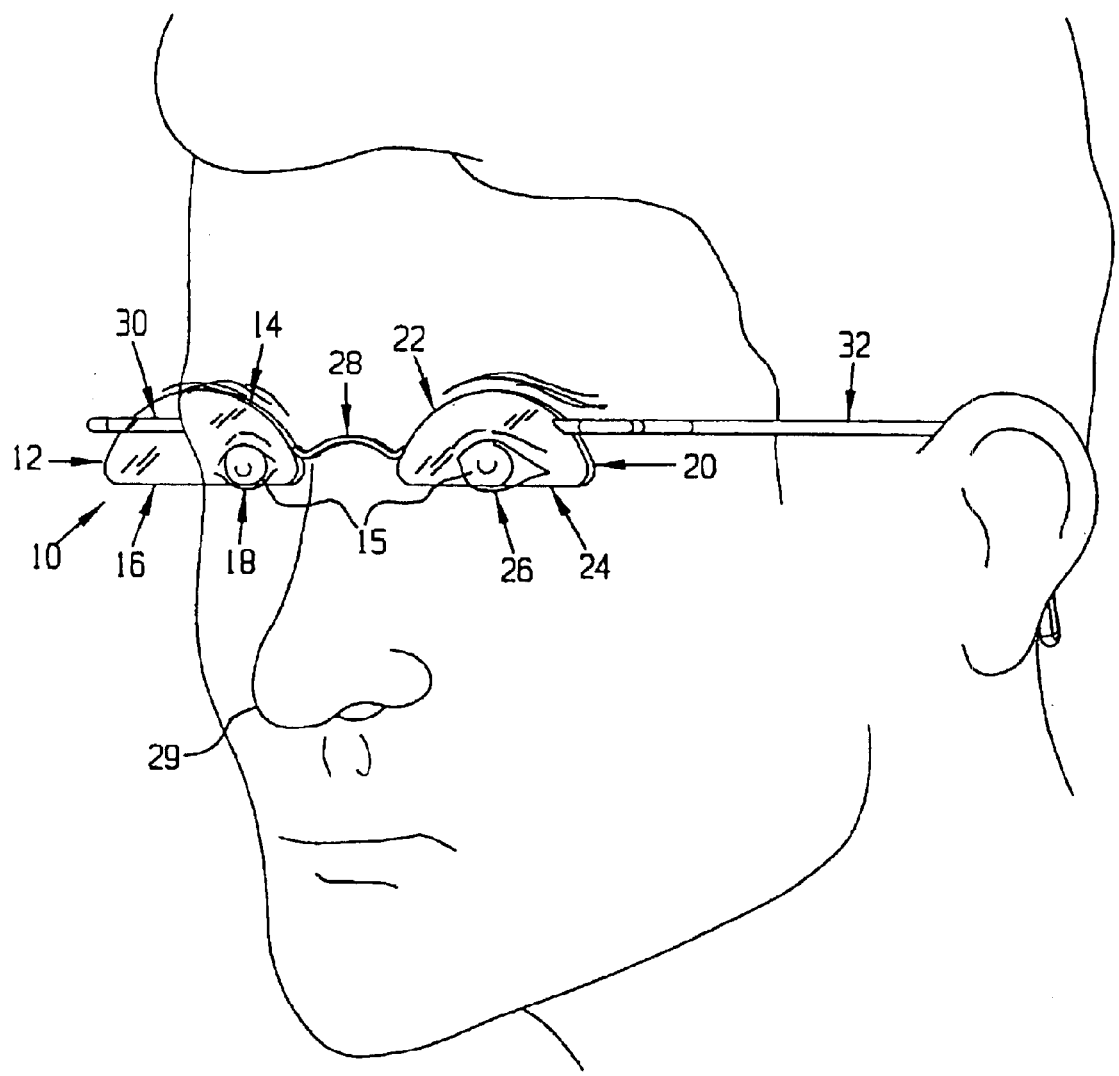
FIG. 1 depicts a front view of the eyeglasses on a wearer.

FIG. 1 shows a pair of eyeglasses 10 which have a right lens 12 and a left lens 20. The right lens 12 has a top edge 14, a bottom edge 16 and is in optical registry with the wearer's right eye 18. The left lens 20 has a top edge 22, a bottom edge 24 and is in optical registry with the wearer's left eye 26. The eyeglasses have a supporting element 28 which is connected to the left lens 20 and the right lens 12 and rests on the bridge of the wearer's nose 29. Additionally the eyeglasses 10 have a supporting element 30 to rest on the wearer's right ear and a supporting element 32 to rest on the wearer's left ear. The bottom edge 16 of the right lens 12 is straight, unobstructed and aligned with the bottom of the wearer's cornea. The bottom edge 24 of the left lens 20 is straight, unobstructed and aligned with the bottom of the wearer's cornea 15. The right lens 12 and left lens 20 of the eyeglasses 10 may be tinted. The right lens 12 and left lens 20 of the eyeglasses 10 may be designed to provide optical correction for individuals with visual impairments. Such a lens would create an upper corrected field of vision and a lower, uncorrected field of vision for the wearer. In a preferred embodiment the right lens 12 and left lens 20 can be half-circles, half-ellipses, square or rectangular in shape. The frame, which consists of the supporting element 26 which rests on the bridge of the wearer's nose 29, the supporting element 30 which rests on the wearer's right ear and a third supporting element 32 which rests on the wearer's left ear. This frame may also consist of additional supporting elements framing the upper edge 14 of the right lens 12 and the upper edge 22 of the left lens 20, and can be made from plastic, metal, wire or any combination of the three. An appropriate use of these glasses would be for the used to tilt his or her head downward to invoke the full protection of the corrective or tinted upper lens, while tilting their head upward would allow nearly a fully unobstructed view below the lenses. Additional situations where these glasses might prove useful are for police officers or individuals at a gathering, as they would be able to tilt their head down in an effort to disguise themselves behind the glasses or hide the direction in which their eyes are looking.

Figure 2:
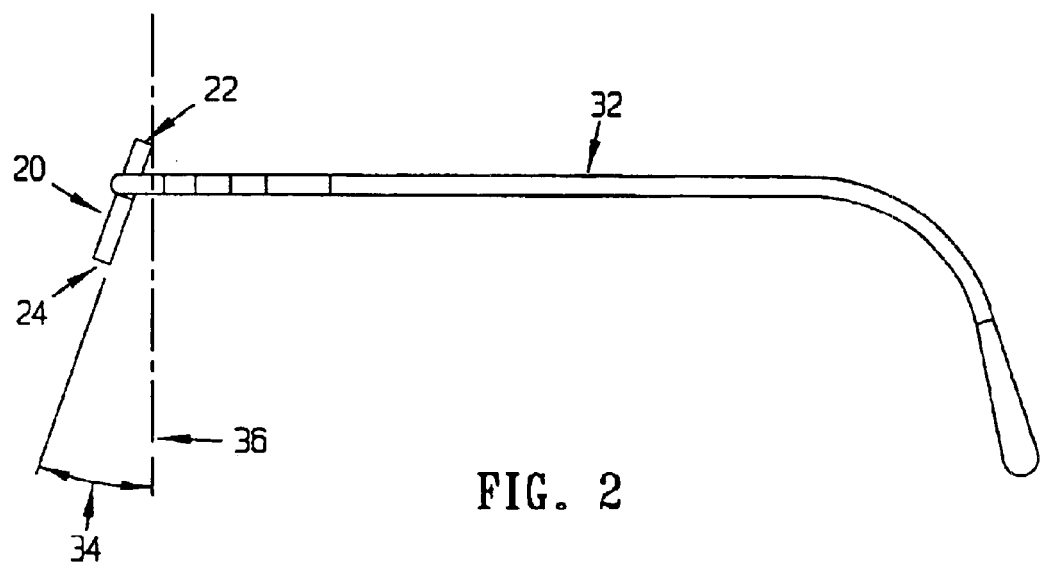
FIG. 2 depicts a side view of the eyeglasses.

FIG. 2 depicts a side view of the eyeglasses 10. The top edge 22 of left lens 20 is shown intersecting the vertical axis 36, while the bottom edge 24 of the left lens 20 projects from the vertical axis 36 at an angle 34 which varies from 0.5 degrees to 20 degrees.

Figure 3:
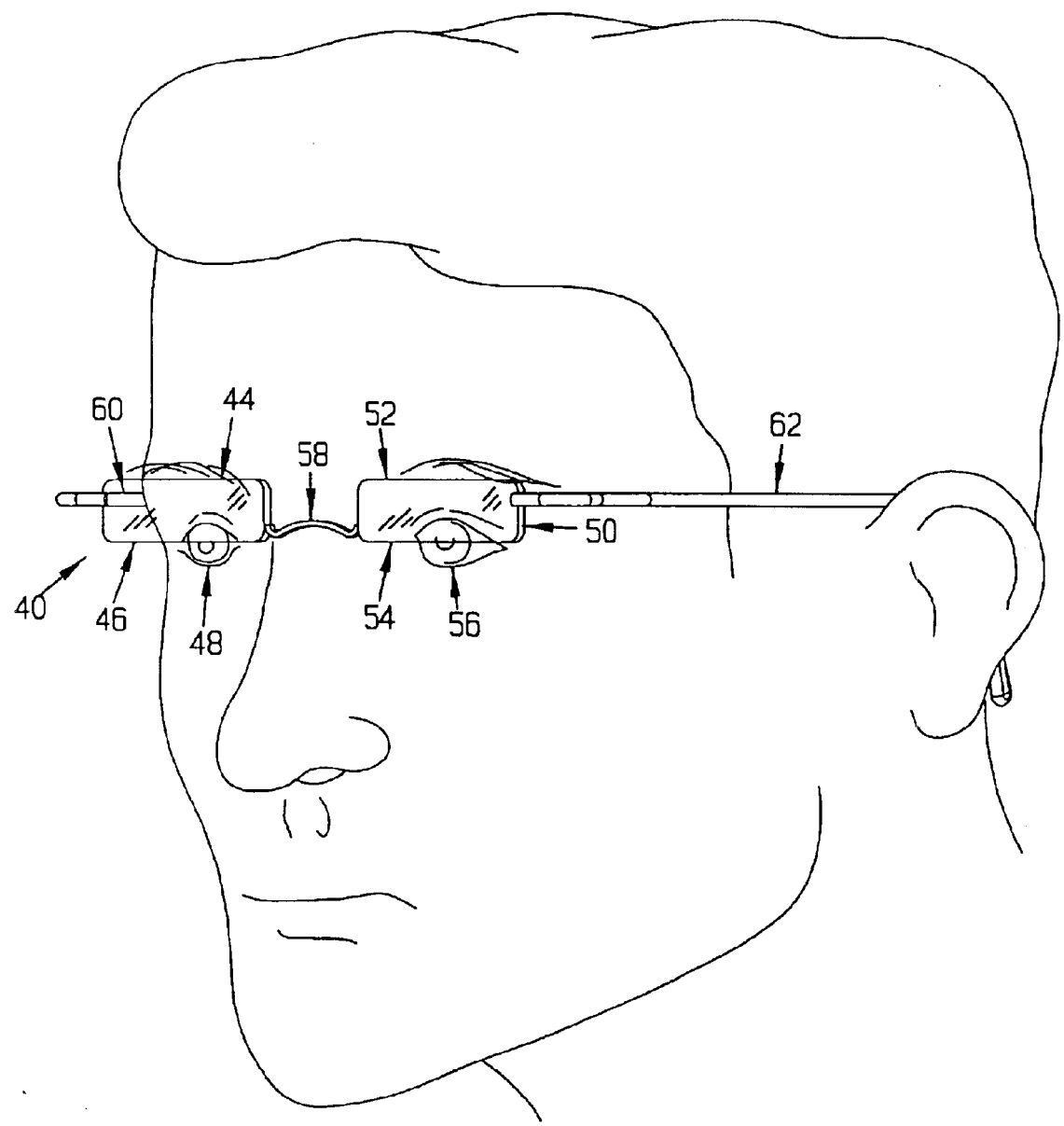
FIG. 3 depicts a front view of the eyeglasses on a wearer.

FIG. 3 depicts an alternate embodiment where the bottom edge 46 of the right lens 42 covers between 40 and 90 percent of the wearer's right cornea 48. The bottom edge 54 of the left lens 50 covers between 40 and 90 percent of the wearer's left cornea 56.

Figure 4:
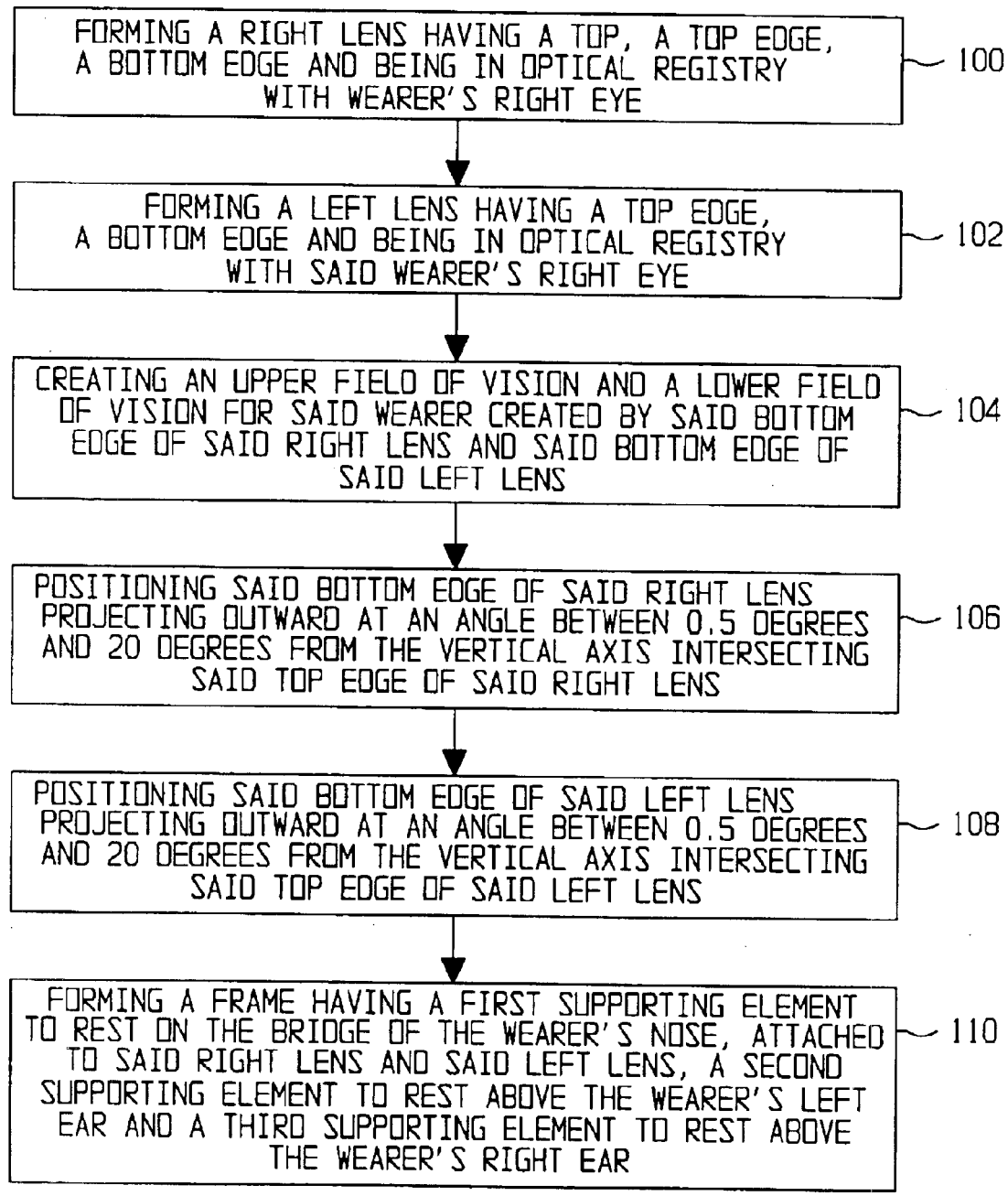
FIG. 4 depicts the steps necessary for manufacturing the eyeglasses.

FIG. 4 depicts a method of manufacturing eyeglasses as disclosed in the embodiments discussed supra. The method consists of the step 100 of forming a right lens having a top a right lens having a top edge, a bottom edge and being in optical registry with wearer's right eye. This is followed by the step 102 of forming a left lens having a top edge, a bottom edge and being in optical registry with said wearer's left eye. These steps are followed by step 104 which consists of creating an upper field of vision and a lower field of vision for said wearer created by said bottom edge of said right lens and said bottom edge of said left lens, followed by step 106 which consists of positioning said bottom edge of said right lens projecting outward at an angle between 0.5 degrees and 20 degrees from the vertical axis intersecting said top edge of said right lens. Step 108 follows including positioning said bottom edge of said left lens projecting outward at an angle between 0.5 degrees and 20 degrees from the vertical axis intersecting said top edge of said left lens, concluded with step 110, consisting of forming a frame having a first supporting element to rest on the bridge of the wearer's nose, attached to said right lens and said left lens, a second supporting element to rest above the wearer's left ear and a third supporting element to rest above the wearer's right ear.

I claim:

1. A pair of eyeglasses comprising:
a right lens having a top edge, a bottom edge and being in optical registry with wearer's right eye;
a left lens having a top edge, a bottom edge and being in optical registry with said wearer's left eye;
an upper field of vision and a lower field of vision for said wearer wherein said lower field of vision is created for viewing below said bottom edge of said right lens and said bottom edge of said left lens;
said bottom edge of said right lens projects outward in a fixed position at an angle between 0.5 degrees and 20 degrees from the vertical axis intersecting said top edge of said right lens;
said bottom edge of said left lens projects outward in a fixed position at an angle between 0.5 degrees and 20 degrees from the vertical axis intersecting said top edge of said left lens;
a frame having a first supporting element to rest on the bridge of the wearer's nose, attached to said right lens and said left lens, a second supporting element to rest above said wearer's left ear and a third supporting element to rest above said wearer's right ear; and said bottom edge of said right lens and said left lens being straight, unobstructed and aligned with the bottom of said wearer's cornea.

2. A pair of eyeglasses as in claim 1, wherein said lenses are shaded or tinted.

3. A pair of eyeglasses as in claim 1, wherein said right lens and said left lens provide an upper corrected field of vision, below said right lens and said left lens, a lower uncorrected field of vision for said wearer's right eye and said wearer's left eye.

4. A pair of eye glasses as in claim 1, wherein said right lens and said left lens are semi-circular in shape.

5. A pair of eyeglasses as in claim 1, wherein said right lens and said left lens are semi-elliptical in shape.

6. A pair of eyeglasses as in claim 1, wherein said right lens and said left lens are rectangular in shape.

7. A pair of eyeglasses as in claim 1, wherein said frame is selected from the following: metal frame; plastic frame; wire frame; metal and plastic frame; metal and wire frame; plastic and wire frame; or metal, plastic and wire frame.

8. A pair of eyeglasses comprising:
a right lens having a top edge, a bottom edge and being in optical registry with wearer's right eye;
a left lens having a top edge, a bottom edge and being in optical registry with said wearer's left eye;
an upper field of vision and a lower field of vision for said wearer wherein said lower field of vision is created for viewing below said bottom edge of said right lens and said bottom edge of said left lens;
said bottom edge of said right lens projects outward in a fixed position at an angle between 0.5 degrees and 20 degrees from the vertical axis intersecting said top edge of said right lens;
said bottom edge of said left lens projects outward in a fixed position at an angle between 0.5 degrees and 20 degrees from the vertical axis intersecting said top edge of said left lens;
a frame having a supporting element to rest on the bridge of the wearer's nose, attached to said right lens and said left lens, a supporting element to rest above said wearer's left ear, a supporting element to rest above said wearer's right ear;
said bottom edge of said right lens and said left lens being straight and unobstructed; and
said right lens and said left lens are positioned to cover between 40 percent and 90 percent of said wearer's cornea.

9. A pair of eyeglasses as in claim 8, wherein said lenses are shaded or tinted.

10. A pair of eyeglasses as in claim 8, wherein said right lens and said left lens provide an upper corrected field of vision and below said right lens and said left lens, a lower uncorrected field of vision for said wearer's right eye and said wearer's left eye.

11. A pair of eyeglasses as in claim 8, wherein said right lens and said left lens are positioned to cover between 45 percent and 55 percent of said wearer's cornea.

12. A pair of eyeglasses as in claim 8, wherein said right lens and said left lens are positioned to cover between 55 percent and 65 percent of said wearer's cornea.

13. A pair of eyeglasses as in claim 8, wherein said right lens and said left lens are positioned to cover between 65 percent and 75 percent of said wearer's cornea.

14. A pair of eyeglasses as in claim 8, wherein said right lens and said left lens are positioned to cover between 75 percent and 85 percent of said wearer's cornea.

15. A pair of eyeglasses as in claim 8, wherein said right lens and said left lens are semi-circular in shape.

16. A pair of eyeglasses as in claim 8, wherein said right lens and said left lens are semi-elliptical in shape.

17. A pair of eyeglasses as in claim 8, wherein said right lens and said left lens are rectangular in shape.

18. A pair of eyeglasses as in claim 8, wherein said frame is selected from the following: metal frame; plastic frame; wire frame; metal and plastic frame; metal and wire frame; plastic and wire frame; or metal, plastic and wire frame.

19. A pair of eyeglasses comprising:
a right lens having a top edge, a bottom edge and being in optical registry with wearer's right eye;
a left lens having a top edge, a bottom edge and being in optical registry with said wearer's left eye;
an upper field of vision and a lower field of vision for said wearer wherein said lower field of vision is created for viewing below said bottom edge of said right lens and said bottom edge of said left lens;
said bottom edge of said right lens projects outward in a fixed position at an angle between 0.5 degrees and 20 degrees from the vertical axis intersecting said top edge of said right lens;
said bottom edge of said left lens projects outward in a fixed position at an angle between 0.5 degrees and 20 degrees from said vertical axis intersecting said top edge of said left lens;
a frame having a first supporting element to rest on the bridge of said wearer's nose, attached to said right lens and said left lens, a second supporting element to rest above said wearer's left ear, a third supporting element to rest above said wearer's right ear;
said bottom edge of said right lens and said left lens being straight and unobstructed;
said right lens and said left lens are positioned to cover between 40 percent and 100 percent of said wearer's cornea;
said lenses are shaded or tinted; and
said right lens and said left lens provide an upper corrected field of vision and a lower uncorrected field of vision for said wearer's right eye and, below said right lens and said left lens, said wearer's left eye.

20. A pair of eyeglasses as in claim 19, wherein said right lens and said left lens are semi-circular in shape.

21. A pair of eyeglasses as in claim 19, wherein said right lens and said left lens are semi-elliptical in shape.

22. A pair of eyeglasses as in claim 19, wherein said right lens and said left lens are semi-rectangular in shape.

23. A pair of eyeglasses as in claim 19, wherein said frame is selected from the following: metal frame; plastic frame; wire frame; metal and plastic frame; metal and wire frame; plastic and wire frame; or metal, plastic and wire frame.

24. A method of manufacturing a pair of eyeglasses comprising the step of:
forming a right lens having a top edge, a bottom edge and being in optical registry with wearer's right eye;
forming a left lens having a top edge, a bottom edge and being in optical registry with said wearer's left eye;
creating an upper field of vision and a lower field of vision for said wearer wherein said lower field of vision is created for viewing below said bottom edge of said right lens and said bottom edge of said left lens;
positioning said bottom edge of said right lens projecting outward in a fixed position at an angle between 0.5 degrees and 20 degrees from the vertical axis intersecting said top edge of said right lens;

positioning said bottom edge of said left lens projecting outward in a fixed position at an angle between 0.5 degrees and 20 degrees from the vertical axis intersecting said top edge of said left lens; and forming a frame having a first supporting element to rest on the bridge of the wearer's nose, attached to said right lens and said left lens, a second supporting element to rest above said wearer's left ear and a third supporting element to rest above said wearer's right ear.

25. A method as in claim 24, wherein said right lens and said left lens are semi-circular in shape.

26. A method as in claim 24, wherein said right lens and said left lens are semi-elliptical in shape.

27. A method as in claim 24, wherein said right lens and said left lens are rectangular in shape.

28. A method as in claim 24, wherein said frame is selected from the following: metal frame; plastic frame; wire frame; metal and plastic frame; metal and wire frame; plastic and wire frame; or metal, plastic and wire frame.

* * * * *